United States Patent [19]
Gronbeck et al.

[11] Patent Number: 5,702,611
[45] Date of Patent: Dec. 30, 1997

[54] PROCESS FOR REMOVING HEAVY METAL IONS BY ION EXCHANGE

[75] Inventors: Dana A. Gronbeck, Holliston, Mass.; Kathleen M. O'Connell, Cumberland, R.I.; William Andrew Burke, Bass River; Michael N. Gaudet, Fitchburg, both of Mass.; Stefan J. Caporale, Summit, N.J.

[73] Assignee: Shipley Company, L.L.C., Marlborough, Mass.

[21] Appl. No.: 783,131

[22] Filed: Jan. 14, 1997

[51] Int. Cl.$^6$ ................................................ B01D 15/04
[52] U.S. Cl. ........................................... 210/686; 210/688
[58] Field of Search ................................ 210/686, 688, 210/912, 913

[56] References Cited

U.S. PATENT DOCUMENTS

| | | | |
|---|---|---|---|
| 5,350,714 | 9/1994 | Trefonas et al. | 210/663 |
| 5,443,736 | 8/1995 | Szmanda et al. | 210/688 |
| 5,472,616 | 12/1995 | Szmanda et al. | 210/683 |
| 5,500,127 | 3/1996 | Carey et al. | 210/686 |
| 5,518,628 | 5/1996 | Carey | 210/686 |
| 5,525,315 | 6/1996 | Burke | 210/688 |
| 5,571,657 | 11/1996 | Szmanda et al. | 210/688 |

FOREIGN PATENT DOCUMENTS

93/12152  6/1993  WIPO .

*Primary Examiner*—Ivars Cintins
*Attorney, Agent, or Firm*—Robert L. Goldberg

[57] ABSTRACT

The invention is for a process of removing dissolved heavy metal cation contaminants from an organic solution. The process of the invention involves providing a mixture of a chelating ion exchange resin modified by removal of sodium ions therefrom and an anion exchange resin and contacting said organic solution with said exchange resins for a time sufficient to remove ionic metal impurities and acids. The invention is useful for removal of ionic contaminants from organic solutions requiring high purity.

20 Claims, No Drawings

PROCESS FOR REMOVING HEAVY METAL IONS BY ION EXCHANGE

BACKGROUND OF THE INVENTION

1. Introduction

This invention relates to removal of dissolved contaminants from organic solutions. More particularly, this invention relates to removal of dissolved metallic and acidic contaminants from organic solutions used in integrated circuit manufacture.

2. Description of the Prior Art

Ultra pure liquids free of particulate, ionic and organic contamination are required for many industrial purposes such as for the manufacture of pharmaceuticals and for the fabrication of integrated circuits. For example, in the manufacture of high resolution integrated circuits, it is known that many processing liquids come into contact with a bare wafer or resist coated surface. These include photoresists and treatment chemicals such as organic liquids and aqueous solutions which contain acids, bases, oxidants, and other proprietary ingredients. At least 15 to 50 liquids of various compositions are used to clean wafers, prime surfaces, deposit resists or other polymers, develop, rinse, etch or strip resist. It is known that these solutions may be a source of contamination of the integrated circuit wafer which may interfere with its performance. Thus, the reduction or removal of insoluble and soluble contaminants from processing fluids used for the production of integrated circuits before or during use is basic to prevent damage to the integrated circuit.

Photoresist coating compositions are used extensively in integrated circuit manufacture. Such compositions typically comprise a light-sensitive component and a polymer binder dissolved in a solvent. Typical photoresist compositions are disclosed in U.S. Pat. Nos. 5,178,986; 5,212,046; 5,216,111; and 5,238,776, each incorporated herein by reference for disclosure of photoresist compositions, processing of resist coatings and use.

It is known that photoresist coating compositions contain particulate and ionic contaminants. For example, it is known that solid gels or irksolubles form in photoresists due to reactions of the photoactive component of the resist. In addition, soluble impurities such as moisture, silicone oils, plasticizers, acid and bases and metal ions may be present from the manufacture of the resist components and from packaging containers or dispensing tanks for the resists. In addition to contaminants, bubbles from point-of-use filtration or the shaking of a resist bottle prior to dispensing can lead to defects in a resist coating. In Class 100 clean rooms, airborne particulate counts amount to 3 particles per liter. By comparison, liquids contain about 100,000 particles per liter. A particle count of 100,000 per liter seems high, but if translated into a solid of 0.6 μM in size, this is equivalent to 10 parts per million parts of solution (ppm). A level of 10 ppm amounts to the deposition of 10 mg per liter. Since liquids are heavily contaminated compared to clean room air, effective contaminant removal is essential to the manufacture of devices requiring ultra pure materials.

Ultrafiltration of resist liquids has progressed and manufacturers of resist now supply resist materials filtered through 0.04 μM diameter absolute filters. However, methods for removal of particulates from treatment solutions are not effective for removal of dissolved contaminants from solution such as organic impurities and ionic species. These contaminants can be at least as damaging to integrated circuit performance as particulate contamination.

Efforts to remove dissolved cationic and anionic contaminants from treatment solutions used to manufacture integrated circuits are known in the art. For example, one such method, disclosed in International Publication No. WO 93/12152 and incorporated herein by reference, is directed to removing metal ions such as sodium and iron from novolak resins during manufacture. The process comprises cation exchange treatment whereby a cation exchange resin is first washed with a mineral acid solution to reduce the level of total sodium and iron ions within the exchange resin to preferably less than 100 ppb, passing a formaldehyde reactant through the so treated cation exchange resin to decrease the sodium and iron ion content to less than 40 ppb, passing a phenolic compound through the cation exchange resin to decrease its sodium and iron ion content to less than 30 ppb, and then condensing the so treated phenolic compound with formaldehyde in the presence of an acid catalyst to form the resin.

A method for removal of dissolved ionic metals and non-metals from a photoresist is disclosed in published Japanese Patent Application No. 1228560 published Sep. 12, 1989, incorporated herein by reference. In accordance with the procedures of this patent, a photosensitive resin is passed through a mixed bed of cation exchange resin and an anion exchange resin to simultaneously remove cation and anionic species from the photoresist solution.

In U.S. Pat. No. 5,571,657 incorporated herein by reference, an improved process is disclosed for removing metallic cations from organic solutions using modified cation exchange resins. In accordance with the process of the invention disclosed therein, the cation exchange resin is modified by replacement of the acid protons on the cation exchange groups with essentially neutral groups such as ammonium or amine groups. Thereafter, an organic solution containing acid labile components may be treated with the modified cation exchange resin to remove metal ions without the formation of undesired by-products caused by attack of acid protons on acid labile groups.

The process described in the above-identified patent is suitable for the removal of dissolved cations from solutions containing an acid labile solution. The process is especially useful for removing mobile metal ions such as sodium and potassium from such solutions. However, the process is less effective for removing heavier metal ions such as iron and chromium from solution.

In U.S. Pat. No. 5,525,315, incorporated herein by reference, a process is provided whereby organic solutions are treated to remove large concentrations of dissolved heavy metal ions using chelating exchange resins. The process comprises providing a cation exchange resin having chelating groups on the resin, treating the resin with an acid to replace sodium ions typically associated with such resins with a hydrogen proton, and contacting the organic solution with said resin to remove dissolved metallic contaminants.

Treatment of the chelating cation exchange resin with an acid results in replacement of sodium ions from the exchange groups thereby preventing contamination of the solution to be treated with the more mobile sodium ions. The removal of sodium ions from the resin is especially important for the purification of organic solutions containing dissolved components used in the formulation of compositions to be used in integrated circuit manufacture.

The process of the above referenced patent effectively removes heavy metal ions from solution, but the step of replacement of sodium ions with acid results in acid groups on the chelating exchange resin. When the organic solution is passed through the chelating exchange resin, acids are introduced into the solution which are unacceptable for photoresist use. This is especially true for photoresists that utilize acid hardening chemistry such as photoresists containing photoacid generators or acid labile groups to obtain differential solubility. Such photoresists are illustrated in U.S. Pat. Nos. 5,182,232 and 5,541,263 and published European applications Nos. 0 164 248 and 0 232 972, each incorporated herein by reference for their disclosure of acid hardening photoresists.

SUMMARY OF THE INVENTION

The process of the present invention is an improvement over the process of U.S. Pat. No. 5,525,315 in that means are used to remove both the heavy metal ions and acid introduced into the resin by the chelating exchange resin. In accordance with the invention, a treated anion exchange resin is homogeneously mixed with the chelating exchange resin to remove heavy metal ions simultaneously with removal of liberated acids.

The process of the invention comprises treatment of a chelating exchange resin with a strong acid solution and washing the so treated resin with water to neutral pH, water washing of an anion exchange resin, admixture of the two to form a uniform mixture where the molar concentration of the base groups on the anion exchange resin do not exceed the moles of acid generated during treatment of an organic solution with the exchange resin mixture, dehydration of the mixed resins and passage of the organic solution through the bed of the mixed ion exchange resin. Preferably, the ratio of the chelating exchange resin to the anion exchange resin is at least 1:2.

For reasons not fully understood, it has been found that use of the two exchange resins sequentially removes metal ion impurities, but not acids. Use of a homogeneously mixed bed unexpectedly removes both.

DESCRIPTION OF THE PREFERRED EMBODIMENTS

The process of the subject invention is applicable to many organic solutions containing dissolved contaminants but is especially useful for treating solutions used in integrated circuit manufacture such as antireflective coating solutions and photoresist solutions, especially solutions containing acid labile components and dissolved metal contaminants in ionic form, especially heavy metal contaminants. Accordingly, the description that follows primarily exemplifies purification procedures for photoresist components and antireflective coatings, especially polymers used to formulate such compositions, but the invention should not be construed as limited to this embodiment.

Photoresists are well known and described in numerous publications including DeForest, *Photoresist Materials and Processes*, McGraw-Hill book Company, New York, Chapter 2, 1975 and Moreau, *Semiconductor Lithography, Principles, Practices and Materials*, Plenum Press, New York, Chapters 2 and 4, 1988, each incorporated herein by reference.

Suitable positive-working photoresists typically contain two components—a light-sensitive compound and a film-forming polymeric binder where the light-sensitive component undergoes photochemical alteration upon exposure. Single component systems are known and typically comprise a polymer that undergoes chain scission upon exposure. The light-sensitive compounds most frequently used in two-component resist systems are esters formed from an o-quinone diazide sulfonic acid, especially sulfonic acid esters of naphthoquinone diazide. These esters are well known and described by DeForest, supra, pages 47–55 and by Moreau, supra, pages 34–52. The light-sensitive compounds and the methods used to make the same are all documented in prior patents including U.S. Pat. Nos. 3,046,110; 3,046,112; 3,046,119; 3,046,121; 3,106,465; 4,596,763; and 4,588,670, all incorporated herein by reference.

The polymer binders most frequently used for positive-working photoresists in conjunction with o-quinone diazides are the alkali soluble phenol formaldehyde resins known as the novolak resins. Photoresists using such polymers are illustrated in U.S. Pat. Nos. 4,377,631 and 4,404,272 incorporated herein by reference. Another class of binders used with o-quinone diazides are homopolymers and copolymers of vinyl phenol. Photoresists of this nature are disclosed in U.S. Pat. No. 3,869,292 incorporated herein by reference. The process of the subject invention is especially useful for the purification of the phenolic polymers used to formulate positive-working photoresists.

Negative-working resists and the components thereof may also be treated in accordance with the invention and are well know in the art. Such photoresists typically undergo random crosslinking upon exposure to activating radiation thereby forming areas of differential solubility. Such resists often comprise a polymer and a photoinitiator. One class of negative-working resists comprises, for example, polyvinyl cinnamates as disclosed by R. F. Kelly, Proc. Second Kodak Semin. Microminiaturization, Kodak Publication Property-89, 1966, Property. 31. Other negative-acting resists include polyvinyl-cinnamates as disclosed in U.S. Pat. No. 2,716,102; azide cyclized rubber as disclosed in U.S. Pat. No. 2,940,853; polymethylmethacrylate/tetraacrylate as disclosed in U.S. Pat. No. 3,149,975; polyimide-methyl methacrylate as disclosed in U.S. Pat. No. 4,180,404; and polyvinyl phenol azide as disclosed in U.S. Pat. No. 4,148,655. Each of the aforesaid references is incorporated herein by reference for the teaching of negative photoresist compositions and the use of the same.

Another class of photoresists suitable for treatment in accordance with the process of the invention are those positive and negative acid-hardening resists disclosed in EPO application Ser. No. 0 232 972 in the name of Feely et al, incorporated herein by reference. These photoresists comprise an acid-hardening resin and a halogenated, organic, photoacid generating compound. Additional acid hardening resists are exemplified in the above referenced U.S. Pat. Nos. 5,182,232 and 5,541,263 and published European application Nos. 0 164 248. These photoresists are characterized by use of acid labile components. Photoresists capable of imaging by exposure to deep U.V. radiation and processes using such photoresists are preferred for purposes of this invention.

Antireflective coating compositions and their uses are also known in the art and are described in numerous articles such as in the *IEEE Transactions on Electron Devices*, Edition 28, No. 11 of November 1981, pp. 1405–1410, entitled "Line Width Control and Projection Lithography Using a Multi-Layer Resist Process" by O'Toole et al.; in "Reduction of the Standing Wave Effect in Positive Photoresist," Brewer et al, in the *Journal of Applied Photographic Engineering*, Vol. 7, No. 6, December 1981, pp. 184–186; in "Control of One-Micron Lines in Integrated Circuits," Carlson et al, *Kodak*, 80 Interface, October 1980, pp 109–113; and in U.S. Pat. Nos. 4,370,403; 4,668,166; 4,719,166; 4,828,960; 4,910,122; and 5,234,990, each incorporated herein by reference.

Typical antireflective coatings comprise an adsorbing dye dispersed in a suitable polymer binder in an amount sufficient to attenuate the reflection of activating radiation into a photoresist coating. In some formulations, the resin binder contains sufficient chromophores to enable adsorption of activating radiation without the use of a separate dye. Typically, when a dye is added, it is used in an amount of about 0.1 to 10 grams per liter of coating composition and more preferably, in an amount of from 1 to 3 grams per liter of coating composition. In selection of the dye, care should be exercised to assure that the dye is compatible with the photoresist used and is thermally stable at processing temperatures used. Further, the dye should be non-volatile at the temperature used and must adsorb reflective radiation at the radiation wavelength used to expose the photoresist. Among the dyes which may be used are 2-(P-(dimethylamino) phenylazo) benzoic acid (Methyl red), 4-(phenylazo) resorcinol (Sudan orange) and di-n-butyl-(5-di-n-butylamino-2,4-pentadienylidene)-ammonium perchlorate. Polymers that may be used with or without dyes include aromatic urea sulfone and aromatic sulfone polymers.

The antireflective coating used may be one capable of having its dissolution properties altered following development of an overlying photoresist coating. This may be accomplished by adding a photoactive compound to the antireflective coating responsive to activating radiation at a wavelength differing from the radiation used to image the photoresist coating. For example, if the photoresist is one imaged by exposure to deep ultraviolet radiation, the photoactive compound used may be one activated by I-Line or G-Line irradiation. In this way, exposure of the photoresist would not alter the dissolution properties of the underlying antireflective layer. Following exposure and development of a photoresist coating, the antireflective layer bared by removal of the photoresist coating would be imaged using radiation at that wavelength capable of altering the dissolution properties of said layer.

Regardless of the method used to process the antireflective layer, it may contain any of a dye, polymer, solvents and light sensitive component. Any or all of the same are a source of contaminants and potentially acid labile. Consequently, contaminants must be removed without causing damage to the components of the coating solution.

Substantially all components of a photoresist composition or an antireflective coating composition are a potential source of dissolved metallic contaminants that can deleteriously effect performance of an integrated circuit. Typical dissolved metal contaminants include sodium, potassium, iron, copper, chromium, nickel, molybdenum, and zinc. While it is known to treat photoresist solutions and solutions of photoresist components with exchange resins to remove dissolved metals, it is also know that conventional ion exchange processes for removal of such contaminants are not suitable for reduction in the concentration of the metallic contaminants to the extent necessary for the manufacture of integrated circuits—i.e., to amounts less than 100 parts per billion parts of solution (ppb) and preferably to levels of less than 25 ppb.

The process of the invention utilizes a mixed bed of a chelating cation exchange resin and an anion exchange resin. The chelating cation exchange resin is one capable of chelating with heavy metal ions. For use in accordance with the invention, the chelating exchange resin is modified to replace sodium or other alkali metal on the resin with a hydrogen proton. The use of such a material for treatment of an organic solution removes heavy metal ions. It is less effective for removal of the more mobile metal ions such as potassium and sodium ions and it may be desirable to treat the solutions containing both mobile metal ions and heavy metal ions with the chelating ion exchange resin of the invention and another ion exchange resin capable of removing mobile metal ions such as the modified cation exchange resins disclosed in U.S. Pat. No. 5,571,657 incorporated herein by reference.

Chelating cation exchange resins are known and described in numerous publications. for example, suitable exchange materials are disclosed by Samuelson, *Ion Exchange Separation Analytical Chemistry*, John Wiley and Sons, New York, 1963, pp. 33, 69, 87, and 88, and in the Meyers, *Encyclopedia of physical Science and Technology*, Second Edition, Harcourt Brace Jovanovich, San Diego, 1992, Volume 3, pp. 363 to 367, each incorporated herein by reference. Typical chelating exchange resins are polyamines on polystyrene, polyacrylic acid or polyethyleneimine backbones; thiourea on polystryene backbones; quinoline on polystyrene backbones; dithiocarbamate on a polyethyleneimine backbone; hydroxamic acid on a polyacrylate backbone; hydroxamic acid on a (methy)acrylate-divinyl benzene copolymer, mercapto on polystyrene backbones; and cyclic polyamines on polyaddition and polycondensation resins. Preferred chelating exchange resins for purposes of this invention are styrene-divinylbenzene copolymers having iminodiacetate groups where two carboxyl groups and the tertiary nitrogen give the resin a chelating capability. Such resins are commercially available as Dow Chelex 100 and Dowex A-1, both available from Dow Chemical Company; Diaion CR-10 available from Mitsubishi; Unicellex UR-10 available from Unitica Chemical; Lewatit TP 207 available from Bayer Corporation; and Amberlite IRC-718 from Rohm and Haas Company. The most preferred embodiment of the invention is the treatment of a resin used to form a photoresist with Amberlite IRC-718 acidified with hydrochloric acid.

The chelating cation exchange resins are typically available in sodium salt form. As discussed above, the sodium ion must be removed from the resin prior to its use to prevent sodium from entering the organic solution treated with the resin. This is accomplished by rinsing the resin with a strong acid. Mineral acids are preferred. Hydrochloric acid is most preferred. It is desirable to avoid use of nitric acid because it is capable of causing undesked side reactions such as nitration and oxidation. Sulfuric acid is satisfactory but does not perform as well as hydrochloric acid.

The chelating ion exchange resin is deskably treated to remove sodium ions by rinsing with an aqueous solution of any of the above acids. Hydrochloric acid is preferred in a concentration of at least 6 molar. The solution used to rinse the exchange resin may contain the acid in a concentration of from 1 to 25 percent by weight and more preferably in a concentration of from 18 to 22 percent by weight. Treatment conditions are not critical. Passing a solution of the acid through a bed of the resin is less effective than slurrying the resin with the acid for a prolonged time. Contact time between exchange material with the treatment solution may vary between about 1 and 30 hours and more preferably, from about 1 to 10 hours. In general, the treatment time is sufficient to provide an exchange resin having a pH varying between about 1 and 6 and more preferably between about 1 and 4.

In accordance with the invention, the chelating ion exchange resin is mixed with an anion exchange resin. The two resins are desirably mixed to form a relatively homogenous mixture. Strong anion exchange resins are typically based upon copolymers of styrene and divinyl benzene which have been chloromethylated and then aminated. The aminated resin is then used to form a quaternary ammonium functional group. Weak base anion exchange resins are also formed from styrene-divinyl benzene copolymers which are chloromethylated and aminated in a two-step process. Chloromethyl groups are attached to the aromatic rings by reaction of a compound such as chloromethyl ether with the copolymer in the presence of a Friedel-Crafts catalyst such as aluminum chloride. Functionalization is completed by aminating the chloromethylated copolymer with either a primary or secondary amine. Ion exchange resins of the type described are well known in the art and described in numerous publications including Kirk-Othrner, Encyclopedia of Chemical Technology, Volume 14, (Fourth Edition), 1995, pp. 737–783, especially pp. 737–749, incorporated herein by reference for their teaching of typical anion exchange resins.

Suitable anion exchange resins include Amberlite IRA-904 which is a styrene-divinyl benzene resin having quaternary ammonium chloride substitution, Amberlite IRA-958 which is an acrylic-divinyl benzene resin having quaternary ammonium chloride substitution, and Duolite A-191 and Duolite A-192, both of which are styrene-divinyl benzene resins having quaternary ammonium chloride substitution. Other ion exchange resins suitable for purposes of the invention would be obvious from the foregoing. Preferred anion exchange resins are the Amberlites LRA-93, IRA-96, IRA-68, IRA 900 and IRN-78.

The next step in the process of the invention comprises forming a mixture of the chelating exchange resin and anion exchange resin. The amount of the anion exchange resin added to the chelating exchange resin is based upon the moles of base groups on the resin. Sufficient anion exchange resin should be used whereby the number of moles of base does not exceed the moles of acid to be removed from solution. It would be expected that the base should exceed the acid content to effect efficient acid removal. However, in practice, it has been found unexpectedly found that excessive base resin acts as a diluent. Preferably, the molar ratio of base groups to acid groups should vary between 1.2 to 10 and 1 to 1.5 and more preferably, between 1 to 2 and 1 to 4.

Following combination of the two exchange resins, the resin mixture is preferably dehydrated by washing the mixture with an aqueous miscible organic solvent such as ethyl lactate, acetone or a solvent common to the solution to be purified. The procedure can be performed at room or elevated temperature though elevated temperature results in increased exchange efficiency, but with possible concomitant degradation of temperature sensitive materials.

Organic solutions are treated with the modified ion exchange resins by slurrying the same with the resin mixture or by passing the solution through a column of a resin mixture. The rate of passage of the solution through the column can vary between about 2 and 20 bed volumes per hour. Ambient conditions are suitable.

The invention will be better understood by reference to the examples that follow.

EXAMPLE 1

Preparation of chelating exchange resin: A chelating ion exchange (IX) resin identified as Amberlite IRC-718, available from Rohm and Haas Company, was prepared for use by charging one liter of 6M hydrochloric acid solution and 600 gms of the chelating resin to a 2 L reaction vessel equipped with a stopcock on the bottom, a polished glass stirring rod with a polypropylene turbine, and mechanical stirrer. The chelating resin slurry was agitated for 3 hours at a speed sufficient for thorough mixing, but slow enough to prevent damage to the chelating resin beads.

The chelating resin—HCl slurry was drained into a 5 cm diameter by 30 cm high column and washed continuously with 18Ω deionized water (flow rate of 15–25 mL/min.— approximately 10 bed volumes) until the runoff pH increased to 7.00±0.5. The chelating resin was drained of water, dehydrated with acetone (one bed volume) followed by ethyl lactate (three bed volumes), and stored in ethyl lactate. Dehydration was considered complete when the effluent solvent had a moisture content of less than 0.5%.

EXAMPLE 2

Preparation of anion exchange resin: An anion exchange resin, identified as Amberlite IRA-93, available from Rohm and Haas Company was prepared for use. A 1200 g quantity of the anion exchange resin was washed in batch mode in a 3 L nalgene beaker with 4-2 L portions of 18Ω deionized water, until the effluent runs clear. The anion exchange resin was drained of water and dehydrated with ethyl lactate (three bed volumes) and stored in ethyl lactate. Dehydration was considered complete when the effluent solvent had a moisture content of less than 0.5%

EXAMPLE 3

A portion (ca 50 g) of the dehydrated chelating resin from Example 1 was added to a fritted glass funnel and partially dried by suction filtration. A 7 g portion of the dried chelating resin was measured into each of two 125 mL Nalgene bottles.

A portion (ca. 50 g) of dehydrated anion exchange resin from Example 2 was dried in the same manner, and a 14 g portion was weighed into one of the Nalgene bottles (supra). Each bottle was charged with 42 g of a 0.2 μm filtered cresolic novolak solution in ethyl lactate (ca. 37% solids by weight) and rolled for 60 minutes. At this time samples were taken of each and analyzed for metals content.

| Metals | Baseline | Aix[1] | Difference | % Removal |
|---|---|---|---|---|
| Mixed Bed - Acid treated IRC-718 and IRA-93 | | | | |
| Cr | 183 | 106 | 77 | 42.3% |
| Fe | 95 | 54 | 41 | 43.2% |
| Na | 37 | 60 | −23 | −63.0% |
| Mo | 182 | 45 | 117 | 64.7% |
| Acid treated IRC-718 Only | | | | |
| Cr | 183 | 160 | 23 | 12.7% |
| Fe | 95 | 73 | 22 | 23.0% |
| Na | 37 | 296 | −260 | −705.4% |
| Mo | 182 | 197 | −15 | −8.4% |

[1] After ion exchange.

These data highlight the performance difference between acid-washed IRC-718 (alone) and in 1:2 combination with IRA-93. The chelating resin alone exhibits poor Mo and Cr removal, and adds higher Na contaminant levels, whereas the mixed bed system exhibits better removal for Fe, Mo, and Cr while contaminating less for Na.

EXAMPLE 4

A batch experiment was set up as in Example 3, except that the chelating resin (from Example 1) was acid treated for 18 hours. Once dried, the chelating resin was weighed out into each of five 125 mL Nalgene bottles as follows: #1, 10 g IRC-718; #2, 10 g IRC-718; #3, 6.33 g IRC-718, #4, 5 g IRC-718; and #5, 0 IRC-718. The dried anion exchange resin was then added to the 125 mL Nalgene bottles in the following amounts: #1, 0 IRA-93; #2, 10 g IRA-93; #3, 13.67 g IRA-93; #4, 15 g IRA-93, and #5, 10 g IRA-93. Into each of the five bottles 40 grams of an acrylate-hydroxystyrene polymer solution in ethyl lactate was added. Each bottle was agitated on rollers for 60 minutes. At this time, the bottles were removed and samples were taken for metals and chloride testing. Results are as follows:

| 1:0 IRC-718 to IRA-93 (in ppb) | | | | |
|---|---|---|---|---|
| Metal | Baseline | Aix[1] | Difference | % Reduction |
| Ca | 15 | 16 | −1 | −5% |
| Zn | 127 | 46 | 81 | 63.8% |
| Fe | 2146 | 1331 | 815 | 38.0% |
| Na | 0 | 109 | −109 | • |
| Mo | 49 | 28 | 21 | 43.3% |

| 1:1 IRC-718 to IRA-93 (in ppb) | | | | |
|---|---|---|---|---|
| Metal | Baseline | Aix[1] | Difference | % Reduction |
| Ca | 15 | 11 | 5 | 29.6% |
| Zn | 127 | 38 | 89 | 70.4% |
| Fe | 2146 | 611 | 1535 | 71.5% |
| Na | 0 | 14 | −14 | • |
| Mo | 49 | 13 | 36 | 74.3% |

| 1:2 IRC-718 to IRA-93 (in ppb) - Optimum Ratio of IX Resins | | | | |
|---|---|---|---|---|
| Metal | Baseline | Aix[1] | Difference | % Reduction |
| CA | 15 | 9 | 6 | 38.8% |
| Zn | 127 | 36 | 91 | 71.5% |
| Fe | 2146 | 572 | 1574 | 73.3% |
| Na | 0 | 0 | 0 | • |
| Mo | 49 | 9 | 40 | 82.0% |

| 1:3 IRC-718 to IRA-93 (in ppb) | | | | |
|---|---|---|---|---|
| Metal | Baseline | Aix[1] | Difference | % Reduction |
| Ca | 15 | 24 | −8 | −55.3% |
| Zn | 127 | 51 | 76 | 59.5% |
| Fe | 2146 | 635 | 1511 | 70.4% |
| Na | 0 | 0 | 0 | • |
| Mo | 49 | 9 | 40 | 80.8% |

| 0:1 IRC-718 to IRA-93 (in ppb) | | | | |
|---|---|---|---|---|
| Metal | Baseline | Aix[1] | Difference | % Reduction |
| Ca | 15 | 16 | −1 | −6.7% |
| Zn | 127 | 74 | 53 | 42.0% |
| Fe | 2146 | 1349 | 797 | 37.1% |
| Na | 0 | 10 | −10 | • |
| Mo | 49 | 25 | 24 | 49.0% |

[1] After ion exchange.

These data highlight the improved performance of the mixed bed system over either the chelating resin alone or in the anion exchange resin alone. The optimum ratio for metals reduction (supra) is one part IRC-718 to two parts IRA-93.

EXAMPLE 5

A column was prepared using ca. 500 mL of the chelating resin slurry in ethyl lactate from Example 1 and 1000 mL of the anion exchange resin slurry in ethyl lactate from Example 2. These slurries were combined in a 3000 mL beaker and stirred with a polypropylene stirrer until a homogeneous mixture was observed. A 2" by 36" column was packed with the slurry, with stirring to maintain ion exchange resin homogeneity. In this way a total bed height of 30" was obtained. A 0.2 μm filtered cresolic novolak solution in ethyl lactate (ca. 37% solids by weight) was passed through the column at a flow rate of ca. 40 mL/min. The first three bed volumes (2300 mL) were discarded to eliminate flow inconsistencies and dilution effects. The remaining novolak solution was collected and cycled over the ion exchange resin bed a total of 4 times, with samples taken in 30 mL HDPE bottles after each pass. Results in ppb are as follows:

| METAL | BIX[1] | 1st PASS | 2nd PASS | 3rd PASS | 4th PASS | Redn. (total) | % RED (total) |
|---|---|---|---|---|---|---|---|
| Cr | 149 | 41 | 20 | 20 | 13 | 136 | 91 |
| Fe | 90 | 49 | 29 | 30 | 15 | 75 | 83 |
| Na | 129 | 54 | 36 | 55 | 41 | 88 | 68 |
| Mo | 212 | 56 | 35 | 35 | 30 | 182 | 86 |

[1] Before ion exchange.

EXAMPLE 6

The chelating and anion exchange resins from examples 1 and 2 (respectively) were dried as described in Example 3, except that ca. 150 g of each resin slurry was used. A 500 mL Nalgene bottle was charged with 42 g of the chelating resin, and 83 g of the anion exchange resin. A 250 g portion of an i-Line photoresist consisting of a naphthoquionone diazide sulfonyl halide ester and novolak resin was added, and the container was rolled for ca. 18 h. A sample was then taken and analyzed for metals content. The results in ppb are as follows:

| Metal | Baseline | Aix[1] | Difference | % Reduction |
|---|---|---|---|---|
| Cr | 79 | 21 | 58 | 73.8% |
| Fe | 39 | 13 | 26 | 66.6% |
| Na | 50 | 16 | 34 | 67.1% |
| Mo | 41 | 23 | 18 | 43.3% |

[1] After ion exchange.

EXAMPLE 7

A batch experiment was set up as described in Example 3, except that a single run was performed using the mixed bed system only. A 40 g portion of an i-Line photoresist consisting of a naphthoquionone diazide sulfonyl halide ester and novolak resin was added, and the container was rolled for ca. 18 h. A sample was then taken and submitted for metals testing. The results in ppb are as follows:

| Metal | Baseline | Aix[1] | Difference | % Reduction |
|---|---|---|---|---|
| Zn | 19 | 13 | 6 | 31.6% |
| Cr | 45 | 8 | 37 | 82.0% |
| Fe | 37 | 19 | 18 | 49.5% |
| Na | 509 | 19 | 490 | 96.4% |
| Mo | 33 | 13 | 20 | 59.6% |
| Ca | 8 | 33 | −25 | −319% |

[1] After ion exchange.

EXAMPLE 8

A column was prepared as described in Example 5 (the "homogeneous" bed). A second 2" by 36" column was prepared (the "stratified" bed) in which ca. 500 mL of the chelating resin slurry in ethyl lactate from Example 1 was added to the column to form a lower layer, and ca. 1000 mL of the anion exchange resin slurry in ethyl lactate from Example 2 was added to the column to form an upper layer. In this way total bed heights of 30" were obtained. A 0.2 μm filtered cresolic novolak solution in ethyl lactate (ca. 37% solids by weight) was passed through each column at a flow rate of ca. 40 mL/min. The first three bed volumes (2300 mL) for each column were discarded to eliminate flow inconsistencies and dilution effects. The remaining novolak solution was collected and cycled over the respective ion exchange resin bed a total of 3 times, with samples taken in 30 mL HDPE bottles after each pass. Results in ppb are as follows:

|  | Stratified bed | | | | Homogeneous bed | | | |
| --- | --- | --- | --- | --- | --- | --- | --- | --- |
|  | Fe | Cr | Mo | Na | Fe | Cr | Mo | Na |
| BASELINE | 153 | 43 | 47 | 411 | 149 | 67 | 40 | 452 |
| 1 PASS | 91 | 33 | 23 | 129 | 52 | 58 | 13 | 122 |
| 2 PASSES | 88 | 35 | 30 | 139 | 27 | 52 | 5 | 127 |
| 3 PASSES | 63 | 35 | 24 | 142 | 22 | 45 | 5 | 89 |
| DIFFERENCE | 90 | 8 | 23 | 269 | 127 | 22 | 35 | 361 |
| % REDN. | 58.9 | 18.3 | 49.0 | 65.4 | 85.0 | 32.9 | 86.5 | 80.3 |

Significantly better performance is seen for the homogeneous bed than for the stratified bed.

EXAMPLE 9

A portion (ca. 250 g) of the dehydrated chelating resin from Example 1 was added to a flitted glass funnel and partially dried by suction filtration. A 100 g portion of the dried chelating resin was measured into the first of two 500 ml. Nalgene bottles (the control) and a 33 g portion of the dried chelating resin was measured into the second (mixed bed).

A portion (ca. 100 g) of dehydrated anion exchange resin from Example 2 was dried in the same manner, and a 67 g portion was weighed into the second (mixed bed) Nalgene bottle (supra). Each bottle was charged with 100 g of a 0.2 mm filtered cresolic novolak solution in ethyl lactate (ca. 37% solids by weight) and rolled for 6 hours. At this time samples were taken of each and submitted for metals content and residual acid. The results (in ppb, unless otherwise indicated) are shown below.

| METAL | BASELINE (No Ion exchange) | CONTROL (IRC-718) | CONTROL % REDUCTION (From Baseline) | MIXED BED (-718 & -93) | MIXED BED % REDUCTION (From Baseline) |
| --- | --- | --- | --- | --- | --- |
| Na | 101 | 453 | −349% | 75 | 25% |
| Fe | 75 | 29 | 61% | 41 | 46% |
| Mo | 230 | 105 | 54% | 39 | 83% |
| Cr | 153 | 88 | 43% | 79 | 49% |
| Acid* | <0.002 | 0.02 | NA | <0.002 | NA |

*Acid Results are reported in parts per thousand; metals results are reported in parts per billion (ppb).

Results show best performance in metal reduction overall with the mixed bed, with no detectable acid residues.

We claim:

1. A process for removing heavy metal ions contained in an organic solution of one or more photoresist or antireflective components while inhibiting introduction of acid into solution, said process comprising the steps of providing a chelating cation exchange resin, washing said chelating cation exchange resin with an acid to remove essentially all metal ions therefrom and rinsing said acid washed chelating cation exchange resin with water until the water effluent has a pH varying between about 1 and 7, homogeneously admixing the chelating cation exchange resin with an anion exchange resin and contacting said organic solution containing heavy metal ions with said mixture of chelating cation exchange resin and anion exchange resin, the contact between the solution and the mixed exchange resins being for a time sufficient to reduce the concentration of said heavy metal ions contained in said organic solution.

2. The process of claim 1 where the molar ratio of base groups to acid groups in the exchange resin mixture varies between 1.2 to 10 and 1 to 1.5.

3. The process of claim 2 where the molar ratio varies between 1 to 2 and 1 to 4.

4. The process of claim 1 where the acid used to prepare the chelating cation exchange resin is a mineral acid.

5. The process of claim 4 where the acid is hydrochloric acid.

6. The process of claim 1 where the organic solution is a solution of a photoresist containing a dissolved photoactive component and an organic polymer binder.

7. The process of claim 1 where the organic solution is a solution of an antireflective coating composition containing a dye and an organic polymer.

8. The process of claim 1 where the organic solution is a solution of an organic polymer.

9. The process of claim 8 where the polymer is a novolak resin.

10. The process of claim 1 where the chelating cation exchange resin is an acrylate-divinyl benzene copolymer having hydroxamic acid groups.

11. The process of claim 1 where the anion exchange resin comprises a polyamine on a polymer backbone selected from the group consisting of polystyrene, polyacrylic acid and polyethylene imine.

12. A process for removing heavy metal ions contained in an organic solution 12. The process of claim 1 where the chelating cation exchange resin comprises a polymer substituted with aminomethyl phosphonate groups.

13. The process of claim 12 where the organic solution is of an organic resin.

14. The process of claim 13 where the resin is a novolak resin.

15. The process of claim 12 where the chelating cation exchange resin is an acrylate-divinyl benzene copolymer having hydroxamic acid groups.

16. A process for removing heavy metal ions contained in an organic solution containing dissolved heavy metal ions while minimizing acid introduction into the solution, said process comprising the steps of contacting said organic solution with a homogenous mixture of a chelating cation exchange resin washed with an acid and an anion exchange resin, the contact between the solution and the exchange resin mixture being for a time sufficient to reduce the concentration of said heavy metal ions contained in said organic solution and the contact with the anion exchange resin being for a time sufficient to remove all acid residues within said organic solution and generated by contact of the solution with the chelating cation exchange resin.

17. The process of claim 16 including the step of washing said acid washed chelating exchange resin with water until the water effluent has a pH varying between about 1 and 7 prior to contacting said organic solution with said chelating cation exchange resin.

18. The process of claim 16 where the molar ratio of base groups to acid groups in the exchange resin mixture varies between 1.2 to 10 and 1 to 1.5.

19. The process of claim 18 where the molar ratio varies between 1 to 2 and 1 to 4.

20. The process of claim 16 where the acid used to prepare the chelation cation exchange resin is hydrochloric acid.

* * * * *